July 12, 1960   H. E. GOLDBERG   2,944,475
PHOTOGRAPHIC RANGE FINDER
Filed June 2, 1955   3 Sheets-Sheet 1
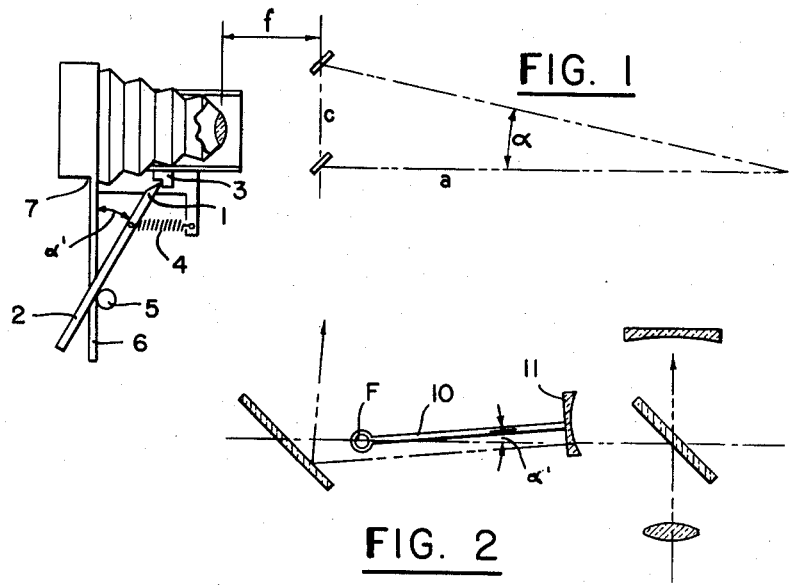
FIG. 1
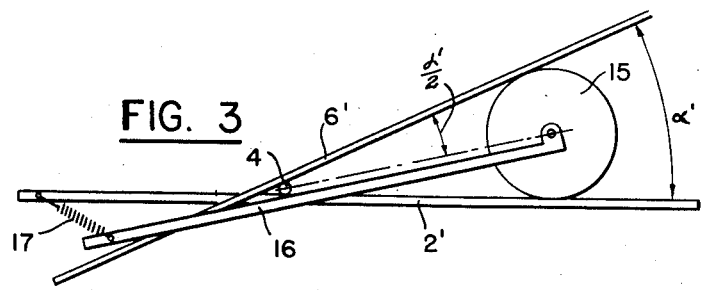
FIG. 2
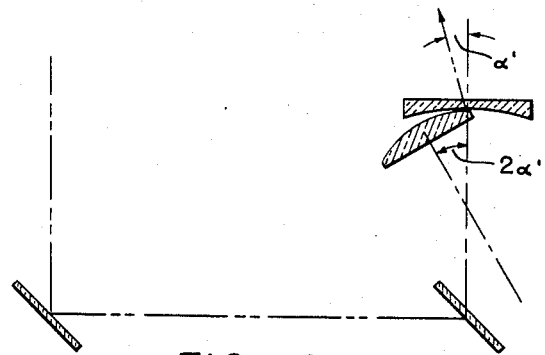
FIG. 3
FIG. 4
INVENTOR.
HERBERT E. GOLDBERG
BY
ATTORNEYS July 12, 1960  H. E. GOLDBERG  2,944,475
PHOTOGRAPHIC RANGE FINDER
Filed June 2, 1955  3 Sheets-Sheet 2
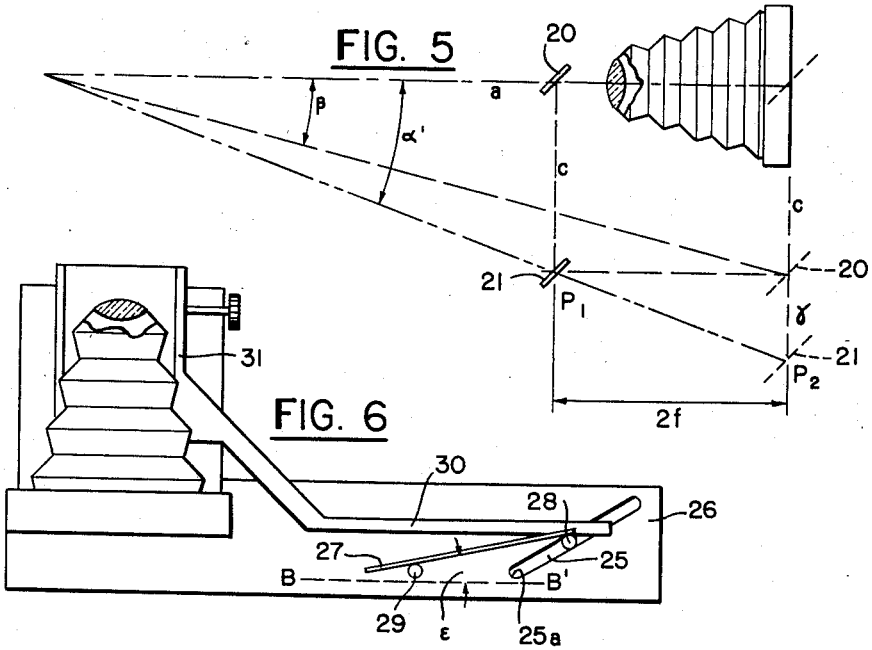
FIG. 5
FIG. 6
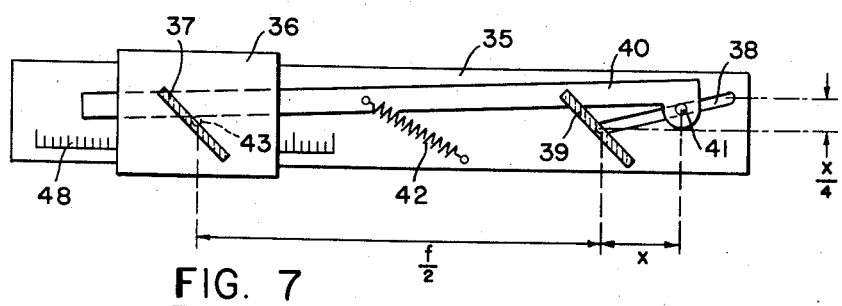
FIG. 7
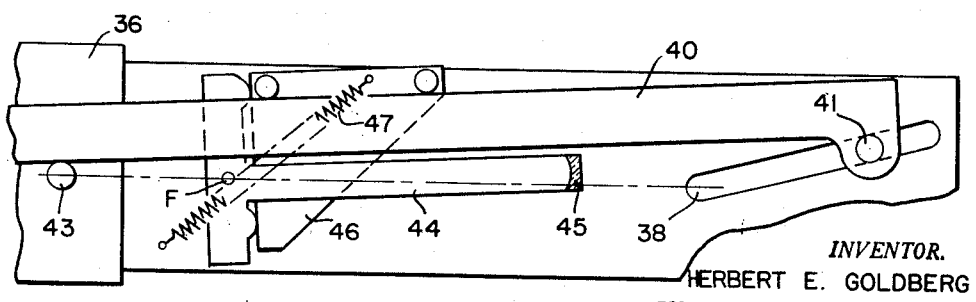
FIG. 8
INVENTOR.
HERBERT E. GOLDBERG
BY
Hane and Nydick
ATTORNEYS

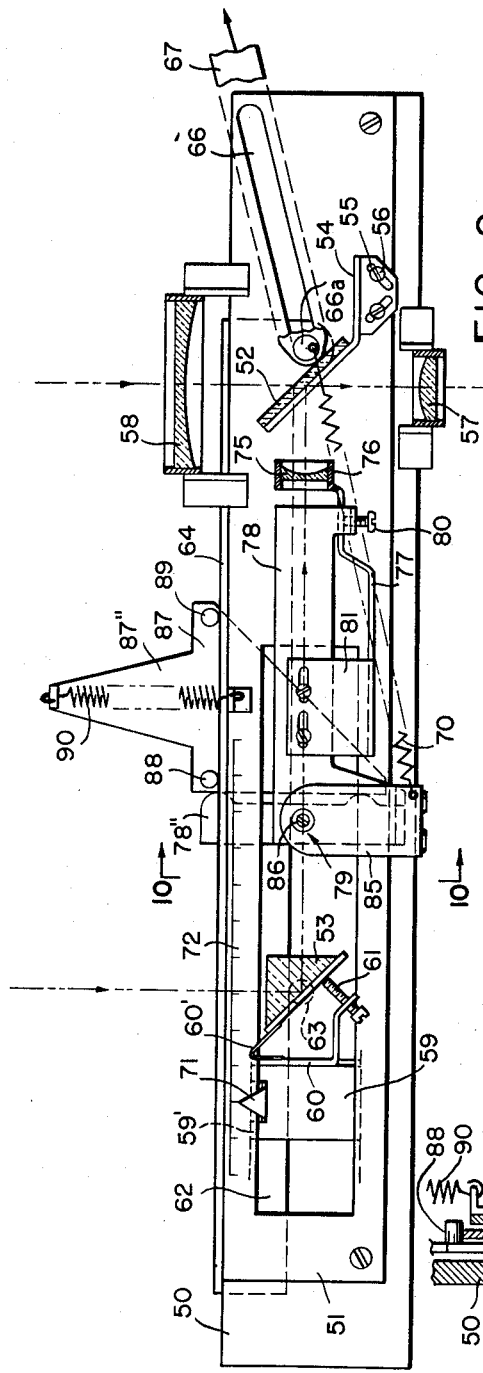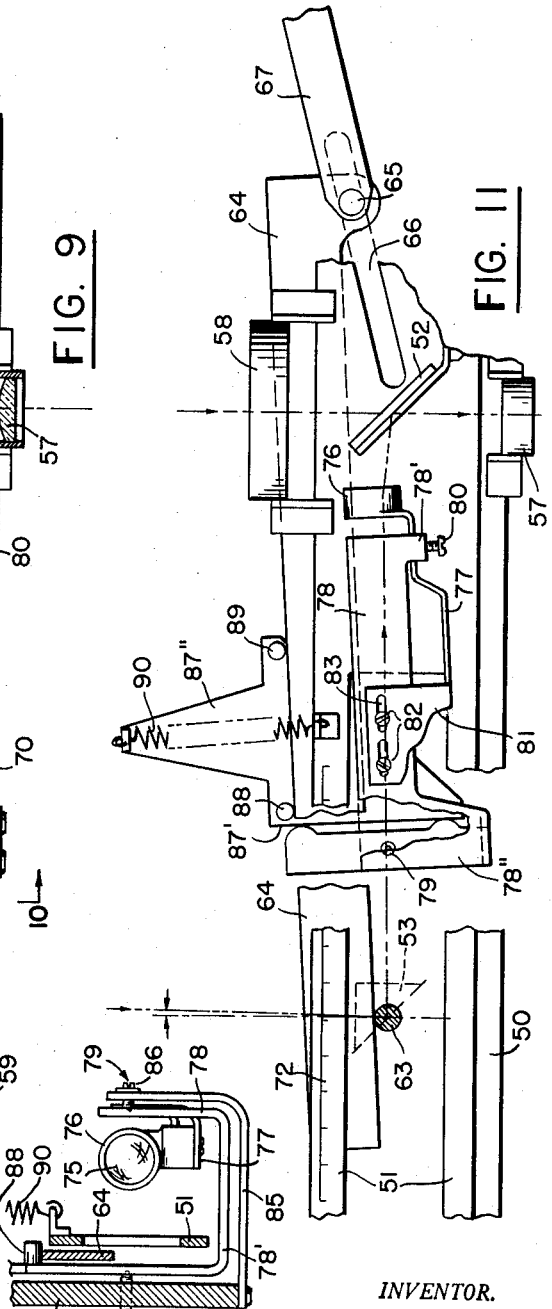

United States Patent Office 2,944,475
Patented July 12, 1960

2,944,475
PHOTOGRAPHIC RANGE FINDER

Herbert E. Goldberg, Plainville, Conn., assignor to The Kalart Company Inc., Plainville, Conn.

Filed June 2, 1955, Ser. No. 512,644

5 Claims. (Cl. 95—44)

The present invention relates to photographic rangefinders designed for coupling to lenses of different focal lengths. Such rangefinders are particularly used in conjunction with press cameras.

There are known rangefinder designs of the general kind above referred to, in which the focusing movement of the lens is transmitted to the rangefinder through a cam arrangement. Such cam arrangement fits a specific lens only and it is necessary to change the cam arrangement whenever the lens is changed. Generally the lenses and the respective cams are purchased as a unit.

There are also known rangefinder designs which can be adapted to lenses of different focal lengths without changing parts. However, such rangefinder designs as heretofore known depend upon adjustments which cannot be readily made, at least not in the field. Furthermore, the mechanisms of rangefinders of this kind employ empirically shaped surfaces and are accurate only over a limited range of focal lengths.

One of the objects of the present invention is to provide a novel and improved rangefinder design which can be readily and rapidly adjusted to cooperate accurately with lenses of widely different focal lengths.

Another object of the invention is to provide a novel and improved rangefinder design which can be accommodated to a broad range of focal lengths, depending only upon the physical size of the parts of the rangefinder mechanism.

Still another object of the invention is to provide a novel and improved rangefinder design which relies upon linear control surfaces so that it can be inexpensively and yet accurately manufactured and directly generates the focusing motion according to the laws of geometrical optics.

A further object of the invention is to provide a novel and improved rangefinder design which can be conveniently designed as a component of a view finder-rangefinder combination.

The rangefinder design according to the invention is based upon the following considerations:

The focusing motion or lens extension necessary to bring a given object into focus may be expressed by the relationship:

$$x = \frac{f^2}{a} \quad (1)$$

where $x$ is the length extension measured from the infinity setting; $a$ is the object distance measured from the front focus; and $f$ is the focal length of the lens.

If a rangefinder be placed in the front focal plane of the lens, the angle of deflection necessary to establish coincidence is:

$$\tan \alpha = \frac{c}{a} \quad (2)$$

where $c$ is the "base length" of the rangefinder and $\alpha$ is the angle subtended by $c$ as seen from the position of the target as shown in Fig. 1 more fully explained hereinafter.

From equations 1 and 2 follows:

$$\tan \alpha = \frac{x}{f^2/c} \quad (3)$$

In the accompanying drawing several preferred embodiments of the invention showing rangefinders, the mechanisms of which duplicates the Equation 3, are shown by way of illustration and not by way of limitation.

In the drawings:

Fig. 1 is a diagrammatic view of a rangefinder mechanism according to the invention.

Fig. 2 is a diagrammatic view showing the principle of deviation of light rays by a swinging lens.

Fig. 3 is a diagrammatic view of an auxiliary mechanism useful for dividing an angle in half.

Fig. 4 is a diagrammatic view of still another modification of the rangefinder mechanism showing the principle of the deviation of a light ray by a wedge of variable angle.

Fig. 5 is an explanatory diagram showing the relationship between the angle of deviation and the base length of a rangefinder.

Figs. 6, 7 and 8 are diagrammatic views of a rangefinder mechanism employing a compensating system according to the invention.

Fig. 9 is a plan view of an actual rangefinder mechanism according to the invention.

Fig. 10 is a section taken on line 10—10 of Fig. 9, and

Fig. 11 is a fragmentary plan view similar to Fig. 9 but showing the rangefinder mechanism in a different position of adjustment.

Referring now to Fig. 1, the mechanism diagrammatically shown in this figure serves, as previously mentioned, to duplicate Equation 3.

To this end, the tip 1 of a rod 2 is coupled at 3 to the tracks of a camera carriage in a manner well known for this purpose. Rod 2 is urged by a spring 4 against a sliding pin 5 locked to a fixed member 6 located at a right angle to the camera track. If the distance between pin 5 and a reference point 7 is kept equal to $f^2/c$, the angle $$\tan \alpha' = \frac{x}{f^2/c}$$

Hence angle $\alpha'$ is equal to angle $\alpha$ of Equation 3 and may be used in various ways in the rangefinder mechanism depending upon the specific optical design. It is, of course, necessary to adjust the distance 5–7 by moving pin 5 whenever a lens is replaced by a lens having a different focal length.

The simplest type of rangefinder optics for the present case, is the swinging lens type in which the deflection of the light beam is directly proportional of the angle of deflection of a lens swinging about its focal point F. Fig. 2 shows such an arrangement coupled with a conventional view finder comprising an eyepiece, a lens and a beam splitter. The part of the rangefinder mechanism which is shown includes a member 10 supporting a lens 11 and swinging about focal point F.

The angle $\alpha'$ is directly reproduced between member 10 and the range finder axis.

If the turning mirror type of rangefinder is employed the mirror must be rotated through $$\frac{\alpha'}{2}$$

This angle may be generated by the system shown in Fig. 3. A circular disc 15 is fastened to a rod 16 and urged by a spring 17 into a fork formed by a fixed member 6' and a rod 2'. The spring 17 also biases rod 16 against pin 4. The angle formed between rod 16 and member 6' is then equal to $$\frac{\alpha'}{2}$$

This angle is transferred by any suitable transmission means to a movable mirror of the optical system of the rangefinder.

Fig. 4 shows a rangefinder of the variable wedge type in which the relationship between the wedge angle and the deflection angle depends upon the index of refraction of the glass that is used for the pair of cylindrical lenses forming members of the wedge. If for instance, the index of refraction is 1.5, one of the lenses must turn through an angle of $2\alpha'$ as is indicated in Fig. 4.

Rangefinders of the type shown in Fig. 1 afford certain advantages, but heretofore they have not been used in practice since it is impractical to mount the optical assembly in front of the camera lens by a distance equal to its focal length and then to move it when a camera lens having a different focal length is substituted.

One of the features of the present invention is to provide two alternatives of a compensating mechanism which overcomes the aforementioned obstacle and permits to locate all the parts of the rangefinder in their usual position on or in the camera body.

Fig. 5 illustrates the principle of the compensating mechanisms.

In this figure $\alpha'$ is the angle of deflection generated by the mechanism previously described. This angle would be the correct angle if the mirrors 20, 21 of the rangefinder are located in the plane $P_1$. If the mirrors are located in the plane $P_2$, it would still be the correct angle provided the rangefinder base $c$ is elongated by a distance $\gamma$, where $$\gamma = 2f\frac{c}{a}$$

$$= 2\frac{c}{f}x$$

As is apparent, the distance $\gamma$ is directly proportional to the focusing motion $x$ of the camera lens.

Alternatively it is apparent that if the base of the rangefinder be kept equal to $c$, angle $\alpha'$ would have to be changed to $\beta$ to keep the rangefinder on the target, where $$\tan \beta = \frac{c}{c+\gamma} \tan \alpha'$$

$$= \frac{f}{f+2x} \tan \alpha$$

The aforestated two principles, especially the second one, lend themselves to the design of practical useful rangefinders. The mechanical structure of such rangefinders may be simplified by making the base of the rangefinder variable and keeping it proportional to the focal length. If $c$ equals $Kf$, the foregoing equations are reduced to:

$$\tan \alpha = K\frac{x}{f}$$

$$\gamma = 2Kx$$

$$\tan \beta = \frac{c}{c+2x} \tan \alpha$$

Fig. 6 shows a design based on $K=1$. In this case the equations become $$\tan \alpha = \frac{x}{f}$$

$$\gamma = 2x$$

$$\tan \beta = \left(\frac{f}{f+2x}\right)(\tan \alpha) = \frac{x}{f+2x}$$

A slot 25 is cut into a base palte 26 at a slope of 1:2 (30°) to the base line B—B' of the rangefinder mechanism. A rod 27 carries a pin 28 which engages slot 25. A sliding pin 29 may be moved along the base line BB' and locked in any position. The distance between sliding pin 29 and the end 25a of slot 25 is adjusted to equal the focal length of the lens used. For standard lenses, notches or holes may be cut into the base plate to permit quick location of pin 29.

An arm 30 extending from the camera carriage 31 travels over slot 25. When the camera is properly focused, pin 28 locates itself by means of a spring at the point of intersection between arm 30 and slot 25. Rod 27 is also biased to bear against pin 29.

From the geometry of this mechanism it is apparent that the angle $\epsilon$ formed between rod 27 and base line BB' is given by the equation:

$$\tan \epsilon = \frac{x}{f+2x}$$

which is the actual angle $\beta$ of deflection in Fig. 5. This angle may be used directly in the swinging lens mechanism of Fig. 2.

In actual design it is often desirable to scale the mechanism of the rangefinder down to a smaller size, especially if lenses with a long focal length are used.

If $r$ is the scale ratio (smaller than one) and if the actual rangefinder base $c$ is equal to the distance between points 25a and 29 of Fig. 6, the following condition exists:

$$\frac{f^2}{c}r = c_2$$

$$r = \frac{c}{f^2}$$

$$r = K^2$$

A practical value for K is $K = \frac{1}{2}$ and in this case $r = \frac{1}{4}$. The distance between points 25a and 29 of Fig. 6 becomes equal to $$\frac{f^2}{Kf}r = \frac{f}{2}$$

In this event, the angle of deflection is:

$$\tan \eta = \left(\frac{x/4}{f/2}\right)\left(\frac{f}{f+2x}\right)$$

$$= \frac{x/4}{f/2+x}$$

Figs. 7 and 8 show a mechanism reproducing the aforestated relationship.

A track 35 carries a carriage 36 to which a rangefinder mirror 37 is fastened. A slot 38 is cut into track 35 at a slope of 1:4 (14°). A second rangefinder mirror 39 is fixedly secured to track 35. A lever 40 engages slot 38 by means of a pin 41 and is urged by a spring 42 against a second pin 43 fastened to carriage 36.

The rangefinder optics are set for coincidence at infinity by an adjustment suitable for the purpose when the distance between pins 41 and 43 is equal to the optical base of the rangefinder.

Whenever camera lenses are changed, carriage 36 is moved along track 35 until the optical rangefinder base equals $f/2$. The distance between pins 41 and 43 changes accordingly. If pin 41 is now moved so that the component of its motion parallel to the axis of the rangefinder equals the focusing motion of the camera lens, it is seen from the figure that the angle equation satisfies the aforestated value of tan $\eta$. It may be transferred to a T-arm 44 supporting the swinging lens 45 and pivotal about focal point F, for instance by means of a transfer member 46. This member is urged by a spring 47 against lever 40 and T-arm 44 as shown in Fig. 8.

In the event the focal length of the camera lens is known, the position of carriage 36 may be set according to a scale 48 calibrated on track 35. In the event the focal length is not known it is sufficient to set the camera lens at its infinity stop, to focus the camera carriage at some nearby object and to move rangefinder carriage 36 until optical coincidence is established in the rangefinder. As a result, the rangefinder mechanism is automatically positioned in the correct position. If desired, the focal length of the camera lens used may then be read on scale 48.

Figs. 9 through 11 show the same mechanism as described in connection with Figs. 7 and 8 in form of an actual practical design.

The rangefinder-view finder combination is shown as being mounted on base plate 50 to which is attached spaced apart a slotted plate or shelf 51 supporting the mechanism proper, partly below the plate and partly above.

The rangefinder comprises two light deviating means 52 and 53. Light deviating means 52 is shown as a semi-transparent mirror mounted on base plate 51 by means of a bracket 54. Elongated slots 55 and set screws 56 permit angular adjustment of the mirror within certain limits. The mirror constitutes a beam splitter disposed in optical alignment with an eye piece 57. This eye piece also constitutes the eye piece of the view finder which further comprises the viewing lens 58. Eye piece 57 may be mounted adjustably relative to mirror 52.

Light deviating means 53 is shown as a prism mounted by means of a bracket 60 on a carriage 59. More specifically, the prism is carried by a springy arm 60' and a set screw 61 threaded through one arm of the bracket which permits to adjust the angular position of prism 53 within certain limits. The carriage 59 is slidably guided in slot 62 of plate 51 by any suitable means such as guide noses 59' underlying plate 51. The underside of carriage 59 supports a pin 63 disposed in the optical axis of mirror 52 and prism 53 and extending into the space between base 50 and plate 51. This pin coacts with a sliding guide member in form of a lever 64 which is guided in a manner hereinafter described to slide with one of its longitudinal edges along pin 63. The forward end of lever 64 mounts guide means in the form of a pin 65 guided in a slanted path formed by a slot 66 provided in plate 51, the position of pin 65 in slot 66 controlling the angular position of lever 64. The slope of slot 66 may be a 1:4 slope (14°), depending upon the specific design of the rangefinder optics. The pin 65 is engaged to a linkage 67 which should be visualized as being coupled to the lens carriage so that the focusing movement of the lens displaces pin 65 within slot 66 thereby effecting a corresponding axial displacement of lever 64. The lever when axially displaced experiences a certain pivotal movement about pin 63 as fulcrum which is controlled by the distance between pins 63 and 65. This distance in turn is adjustable by displacing carriage 59 relative to plate 51.

Reverting to Fig. 7, it is apparent that pins 63 and 65 correspond to pins 43 and 41 of Fig. 7 and that the distance between pins 63 and end 66a of slot 66 may be set to represent f/2. A spring 70 secured on one end to pin 65 and on the other end to a fixed point serves to return lever 64 into the position in which pin 65 occupies the lower end of slot 66 as shown in Fig. 9. Carriage 59 may be provided with a pointer 71 which coacts with a scale 72 provided on plate 51 and calibrated in accordance with the focal lengths of camera lenses to be used.

The range finder further comprises a swinging lens 75 mounted in a sleeve 76 supported by a springy arm 77. Arm 77 is suitably fastened to a support bracket 78 which is pivotal about a point 79 which constitutes the focal point of swinging lens 75. To permit adjustment of the swinging lens, a set screw 80 is provided which is threaded through an extension 78' of bracket 78 and engages springy arm 77. The springy arm itself is secured to bracket 78 by means of an extension 81 of arm 77 and set screws 82 extending through slots 83 in extension 81.

To effect pivoting of lens support bracket 78 about focal point 79, a right angle bracket 85 is secured to base plate 50 as can best be seen in Fig. 10. A pivot pin 86 threaded through the arm of bracket 85 parallel to base plate 50 engages an indentation in bracket 78 so that the bracket and with it lens 75 can swing about focal point 79.

To transfer the swinging movement of lever 64 as controlled by the position of pin 63 and the position of pin 65 in slot 66 to bracket 78 the arm of the latter pivoted to pivot pin 86 is extended by arms 78' and 78'' to form a U-shaped member best seen in Fig. 10. Arm 78'' coacts with a transfer member 87 shown as a generally triangular member. The side 87' of this member is engaged by the respective edge of arm 78'' which for this purpose is provided with two longitudinally spaced protrusions. Transfer member 87 coacts with lever 64 through two pins 88 and 89 which slidably engage the respective longitudinal edge of lever 64. A loaded spring 90 fastened on one end to an extension 87'' of member 87 and on the other end to a stationary point such as base plate 51 biases member 87 against arm 78'' and pins 88, 89 against lever 64.

As a result, lever 64 is guided on one side by pins 63 and 65 and on the other side by pins 88 and 89, pin 63 constituting the fulcrum of the lever. The axial displacement of the lever is limited by the length of slot 66. Consequently, a pivotal movement of the lever in response to a displacement of pin 65 in slot 66 by the action of linkage 67 due to a focusing movement of the lens, is transmitted by transfer member 87 to lens bracket 78 causing a corresponding swinging movement of lens 75.

Reverting to Figs. 7 and 8, it is evident that functionally the structural design of Figs. 9 through 11 corresponds to the diagrammatic design of Figs. 7 and 8. In other words, when the component of motion x of pin 65 parallel to the axis of the range finder equals the focusing motion of the camera lens transmitted to the rangefinder mechanism through linkage 67 and the distance between pins 63 and 65 is set to correspond to the focal length of the respective lens the angle equation satisfies the equation $$\tan \eta = \frac{x/4}{f/2 + x}$$

In order to adjust the rangefinder mechanism to different focal lengths it is merely necessary to set carriage 59 and with it pin 63 accordingly. The setting of the pin will automatically adjust the setting of the rangefinder mechanism for a given focal length of the camera lens.

While the invention has been described in detail with respect to certain now preferred examples and embodiments of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. A photographic range finder of the kind controllable by a focussing movement of the lens system of a camera, said range finder comprising a base plate, a first light deflecting means fixedly mounted on said base plate, a second light deflecting means, a carriage supporting said second deflecting means for slidably displacing the same on the base plate at a constant angular relationship to said fixed light reflecting means, light deviating means disposed between said two deflecting means to obtain coincidence of the light beams, and means for varying the coaction between said deflecting means and said deviating means, said means including a sliding guiding member operatively connected to said light deviating means, and a guide means slidably guided on said base plate at a fixed angular relationship relative to the optical center axis between said deflecting means, one end of said guiding member bearing against said carriage and the other coacting with said guide means, and means for transmitting a focusing movement of the lens system to said guide means to vary correspondingly the position of said guiding member thereby setting the light deviating means in accordance with the focussing movement of the lens system.

2. A photographic range finder of the kind controllable by a focussing movement of the lens system of a camera, said rangefinder comprising a base plate, a light deflecting means fixedly mounted on said base plate, a carriage slidably mounted on said base plate, a second light deflecting means secured to said carriage for varying the separation of said deflecting means, each of the deflecting means acting upon an incident beam of light, a light deviating means disposed between two deflecting means to obtain coincidence of the light beams, said deviating means including a lens means mounted on the base plate pivotal about the focal point, a lever pivotally disposed on the base, said slidable carriage having a protrusion forming a fulcrum engaged by one end of said lever, a guide means slidable along a path having a fixed angular relationship relative to the optical axis between the two deflecting means, said guide means being at the end of the lever opposite the one engaging said fulcrum, means for controlling the position of said guide means relative to said path by a focussing movement of the lens system of the camera, the positions of said fulcrum and said guide means controlling the pivotal position of said bar, and transmission means transmitting the position of said lever to said pivotal lens means thereby setting the same in accordance with the focussing movement of the camera.

3. A range finder according to claim 2, wherein said guide means comprise an element slidably guided in a slot formed in the base plate.

4. A range finder according to claim 2, wherein said transmission means comprise a bracket pivotally mounted on the base plate and supporting said lens means of the deviating means, said bracket being coupled to said lever for control of the pivotal position of said bracket by the pivotal position of the said lever.

5. A range finder according to claim 4, wherein an actuating member is interposed between said lever and said support bracket, said actuating member transmitting an angular motion of the lever to the support bracket.

References Cited in the file of this patent

UNITED STATES PATENTS 2,395,074 Schwartz et al. ......... Feb. 19, 1946

FOREIGN PATENTS 593,893 Germany .............. Feb. 11, 1933
105,765 Australia ............. Sept. 30, 1937